June 7, 1949.   C. P. WATERS   2,472,354
COCOANUT HUSK REMOVING TOOL
Filed June 4, 1946
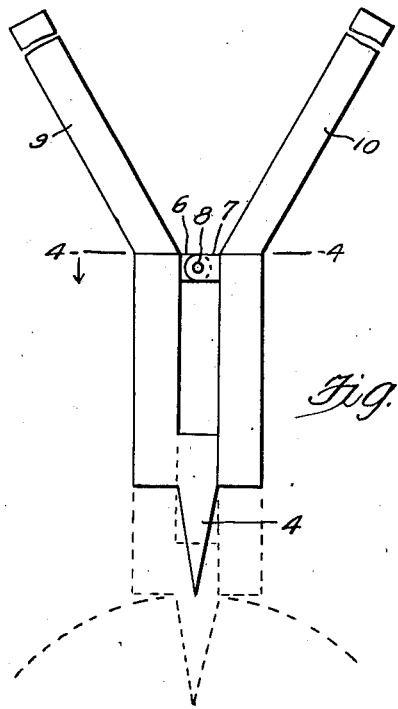
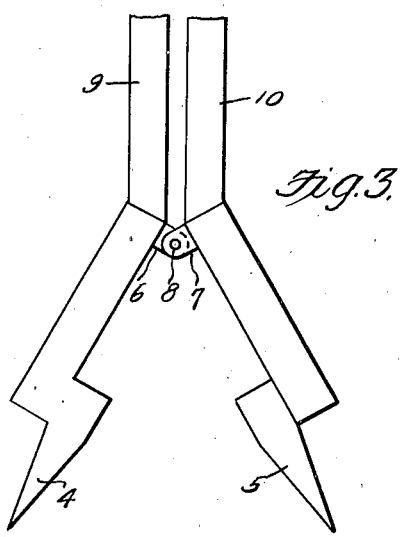
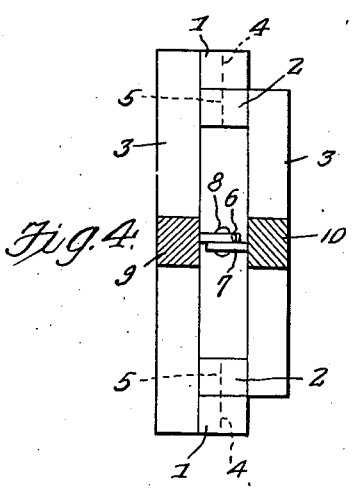
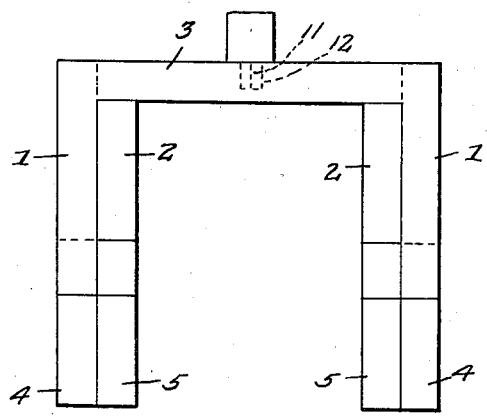
Inventor
Cecil P. Waters,
By *Clarence A. O'Brien and Harvey B. Jacobson*
Attorneys Patented June 7, 1949

2,472,354

UNITED STATES PATENT OFFICE 2,472,354

COCONUT HUSK REMOVING TOOL

Cecil P. Waters, Fort Lauderdale, Fla.

Application June 4, 1946, Serial No. 674,305

2 Claims. (Cl. 146—7)

This invention relates to improvements in cocoanut husk removing tools.

An object of the invention is to provide an improved cocoanut husk removing tool, which will include a pair of pivoted handle members having cooperating inverted U-shaped heads on their lower ends terminating in the pointed teeth which are adapted to be forced through the cocoanut husk and spread apart to split the husk open to get the cocoanut from within the husk.

Another object of the invention is to provide an improved cocoanut husking tool formed with parallel inverted U-shape heads having pointed teeth on their lower extremities, and outwardly flared handles pivoted together adapted to be brought together to split open the cocoanut husk.

A further object of the invention is to provide an improved cocoanut husk removing tool, which will be provided with spaced pairs of husk splitting teeth arranged in alignment and adapted to be forced into a cocoanut husk to split the same to extract the cocoanut therefrom.

Another object of the invention is to provide an improved cocoanut husk removing tool which will be highly efficient in operation, and relatively inexpensive to manufacture and produce.

Other objects will appear as the description proceeds.

In the accompanying drawings which form a part of this application,

Figure 1 is an end elevation of the improved cocoanut husk removing tool shown about to be forced into a cocoanut, and shown in dotted lines within the cocoanut husk;

Figure 2 is a side elevation of the improved cocoanut husk removing tool;

Figure 3 is an end elevation of the cocoanut husk removing tool showing the teeth in spread position, and Figure 4 is a view taken on the line 4—4 of Figure 1.

Like characters of reference are used throughout the following specification and the accompanying drawings to designate corresponding parts.

In carrying out the invention, there is provided an improved cocoanut husk removing tool including a pair of inverted U-shape head members forming shank portions 1 and 2 connected by the cross connecting members 3, and formed with the spaced depending pointed teeth 4 and 5, which are adapted to extend in alinement. The teeth 4 and 5 extend inwardly from the shank portions 1 and 2 of the head members.

The inwardly directed ears 6 and 7 are formed centrally of the cross connecting members 3, and are secured together by the pivot pin 8.

Upwardly and outwardly extending elongated arms 9 and 10 are formed on the central upper portions of the cross connecting members 3, said operating levers or arms being formed integrally therewith, or if desired, they may be secured to said cross connecting members by means of the depending studs 11 which are adapted to be received in suitable sockets 12 formed in the upper surfaces of the cross connecting members 3, as clearly shown in Figure 2 of the drawings.

When it is desired to open and remove a husk from a cocoanut, the operating handles or arms 9 and 10 are moved outwardly until the head members and teeth 4 and 5 are extending in parallel relation and in alinement, respectively, after which the teeth are forced deep into the cocoanut husk with the inward movement thereof halted by the abutting of the shoulders of the members 4 and 5 against the cocoanut husk. Then the operating arms 9 and 10 are brought together on their pivot pin 8, to spread the teeth, thus splitting open the husk to free the cocoanut therefrom.

The tool will be formed from iron or steel or from any metal which will keep its shape when strain is placed on it.

From the foregoing description, it will be apparent that there has been provided a highly efficient tool for quickly and effectively removing the husk from a cocoanut.

Having thus described my invention what I claim as new and desire to secure by Letters Patent of the United States is:

1. A cocoanut husk removing tool including a pair of pivoted, coacting inverted U-shaped head members having inwardly offset depending teeth formed on their lower ends, said teeth being transversely aligned when said tool is in closed position, and upwardly and outwardly extending handles formed on said head members adapted to extend in parallel relation when said tool is in fully open position and the teeth are spread apart.

2. A cocoanut husk removing tool including a pair of pivoted coacting inverted U-shaped head members having inwardly offset depending teeth formed on their lower ends, said teeth being transversely aligned when said tool is in closed position, one set of teeth being engageable with the head member upon which the other set of teeth is supported when said tool is in closed position to serve as a stop for limiting the inward movement of said teeth and head members, and upwardly and outwardly extending handles formed on said head members adapted to extend in parallel relation when said tool is in fully open position.

CECIL P. WATERS.

REFERENCES CITED

The following references are of record in the file of this patent:

UNITED STATES PATENTS

| Number | Name | Date |
| --- | --- | --- |
| 326,909 | Kricker | Sept. 22, 1885 |
| 717,526 | Barney | Jan. 6, 1903 |
| 1,724,739 | Titman et al. | Aug. 13, 1929 |
| 2,058,072 | Fiddyment | Oct. 20, 1936 |